(12) United States Patent
Okunami

(10) Patent No.: US 9,405,173 B1
(45) Date of Patent: Aug. 2, 2016

(54) RETRACTABLE CAMERA DEVICE

(71) Applicant: Polycom, Inc., San Jose, CA (US)

(72) Inventor: Alvin Okunami, Round Rock, TX (US)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 14/873,073

(22) Filed: Oct. 1, 2015

(51) Int. Cl.
*G03B 17/56* (2006.01)
*H04N 5/222* (2006.01)
*H04N 7/14* (2006.01)
*F16M 11/28* (2006.01)

(52) U.S. Cl.
CPC ............. *G03B 17/561* (2013.01); *F16M 11/28* (2013.01); *H04N 5/222* (2013.01); *H04N 7/142* (2013.01)

(58) Field of Classification Search
CPC ...... G03B 17/561; H04N 5/222; F16N 11/28; F16N 11/26
See application file for complete search history.

(56) References Cited

U.S. PATENT DOCUMENTS

| | | | | | |
|---|---|---|---|---|---|
| 3,805,281 | A | * | 4/1974 | Narita | G03B 17/561 343/720 |
| 5,980,124 | A | * | 11/1999 | Bernardi | F16M 11/18 396/428 |
| 6,158,555 | A | * | 12/2000 | Brown, Jr. | H02G 11/003 138/120 |
| 7,364,124 | B2 | * | 4/2008 | Yuasa | F16M 11/18 248/125.8 |
| 8,137,008 | B1 | * | 3/2012 | Mallano | B60R 11/04 396/427 |
| 2002/0162921 | A1 | * | 11/2002 | Rotondi | F16M 11/28 248/125.8 |
| 2007/0064092 | A1 | * | 3/2007 | Sandbeg | H04N 7/142 348/14.02 |
| 2011/0120243 | A1 | * | 5/2011 | Pettersson | A47B 9/04 74/89.28 |

* cited by examiner

*Primary Examiner* — W B Perkey
(74) *Attorney, Agent, or Firm* — Blank Rome, LLP

(57) ABSTRACT

A retractable camera device is described which removes a camera from view when not in use. The device may include a tube having two ends, an interior void and an outer surface, a ballscrew shaft positioned within the interior void of the tube, a camera mast assembly movably coupled to the tube and engaging the ballscrew shaft, a camera, having a 360° viewing angle, coupled to an end of the camera mast, and at least one ribbon cable folded in an accordion pattern and encircling the outer surface of the tube. The at least one ribbon cable has an end electrically connected to the camera. The ballscrew shaft engages the camera mast so as to move the camera mast in an upward and downward direction along a length thereof.

21 Claims, 6 Drawing Sheets

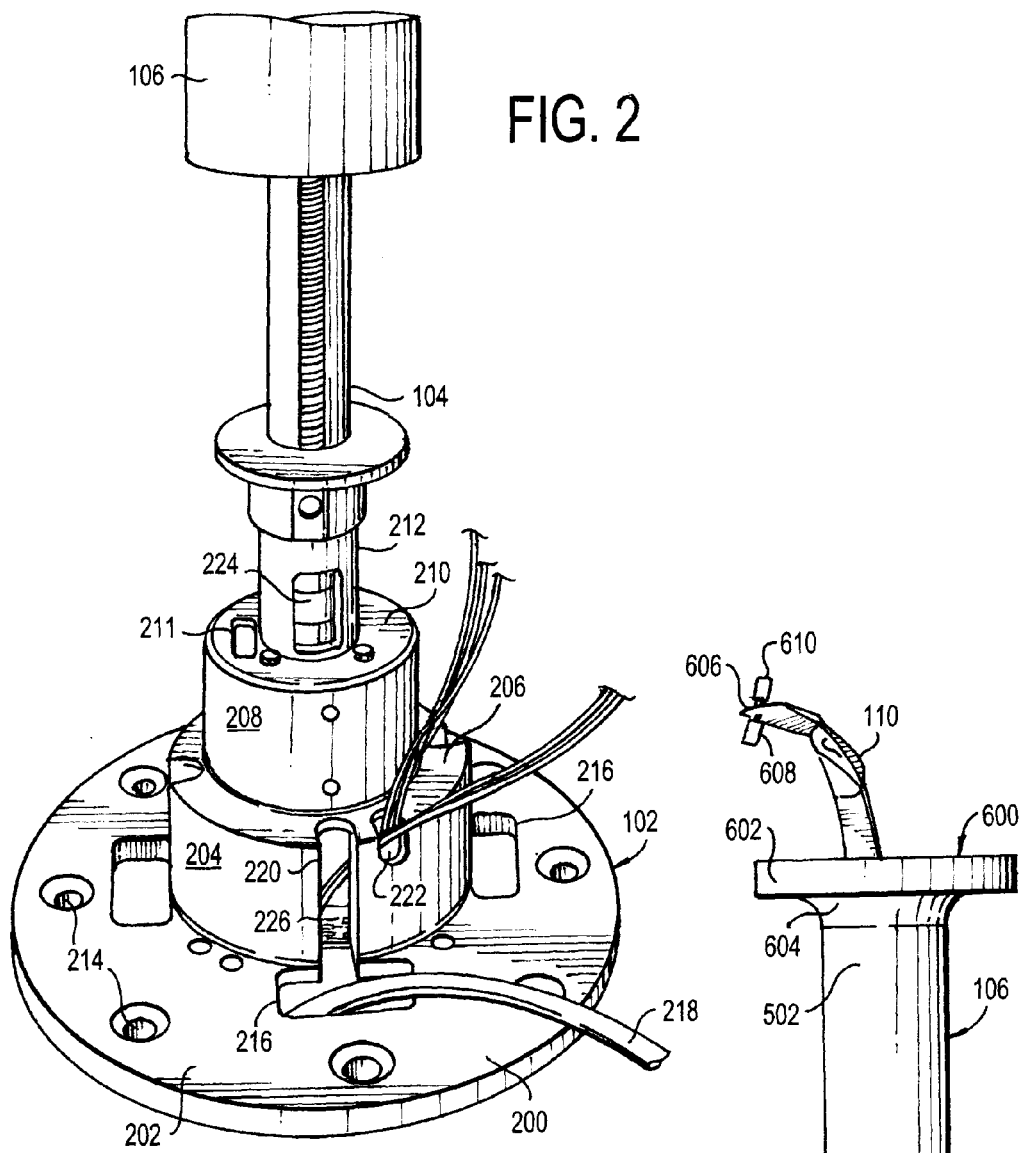

RETRACTABLE CAMERA DEVICE

FIELD OF THE INVENTION

The invention relates to a retractable 360 degree camera device. In particular, the invention relates to a camera having a 360 degree viewing angle that may extend vertically so as to be level with participants in a room, for example during a video conferencing session, or to be hidden from view when not in use. The invention further relates to a video conferencing station incorporating the retractable camera device and a plurality of computer monitors for use by the participants.

BACKGROUND OF THE INVENTION

Circular seating arrangements in conference rooms provide an advantage in allowing participants to interact and communicate more comfortably with everyone in the room. In fact, in a conference room where people meet in a circle, they are able to interact with each other better than in a traditional rectangular conference room. Each person can see other individuals in the room equally without having to turn their heads to see someone in the circle. To capture this interaction for video conferencing, a 360 degree or wide angle camera may be placed in the middle of the group of participants. However, when the camera is not needed, such as when the video conference session has ended, the camera must either be disconnected or physically removed so as to be out of sight and to ensure the participants they are no longer being recorded.

Accordingly, what is needed is a retractable 360 degree camera device.

SUMMARY OF THE INVENTION

To solve this problem, a retractable camera device is provided that allows the camera to be extended and level with the participants' line of sight when in use and lowered to an area out of sight when not in use. An integrated and mobile video conferencing station is also provided incorporating the retractable camera device and a plurality of computer monitors for the participants' use.

A retractable camera apparatus is described comprising a ballscrew assembly and a helical ribbon cable connected to the camera. More particularly, a retractable camera device is described which includes a ballscrew tube having two ends, an interior void and an outer surface, a ballscrew shaft positioned within the interior void of the tube, a camera mast engaging the ballscrew shaft, a camera, having a 360° viewing angle, coupled to the camera mast, and at least one ribbon cable folded in a helical, accordion pattern and encircling the outer surface of the tube, the at least one ribbon cable having an end electrically connected to the camera, wherein rotation of the ballscrew shaft moves the camera mast in an upward and downward direction along a length thereof.

A retractable camera device is detailed comprising a first cylindrical projection having a slot, a second cylindrical projection extending from a surface of the first cylindrical projection, the second cylindrical projection having a smaller diameter than the first cylindrical projection, a ballscrew tube having two ends, an interior void and an outer surface, a ballscrew shaft positioned within the interior void of the tube, a ball nut positioned around the outer surface of the ballscrew tube and directly engaging the ballscrew shaft, a camera mast having a first end and a second end, the second end of the camera mast operably coupled to the ball nut, a camera support plate coupled to the first end of the camera mast, a camera, having a 360° viewing angle, mounted to the camera support plate, an inner tubular sleeve having a first end which slidably engages an outer surface of the second cylindrical projection and encloses the camera mast, at least one ribbon cable folded in a helical, accordion pattern, encircling the outer surface of the tube within the inner tubular sleeve and passing through the slot in the second cylindrical projection, the at least one ribbon cable having a first end electrically connected to the camera, and at least one circuit board, one of which is electrically connected to the second end of the at least one ribbon cable, wherein rotation of the ballscrew shaft moves the ball nut so as to move the camera mast in an upward and downward direction along a length of the ballscrew tube.

Also, a videoconferencing station including a retractable camera is shown. One of the videoconferencing stations described comprises a retractable camera device comprising a support base, a first cylindrical projection extending from the support base, a second cylindrical projection extending from a surface of the first cylindrical projection, the second cylindrical projection having a smaller diameter than the first cylindrical projection, a ballscrew tube having two ends, an interior void, and an outer surface, a ballscrew shaft positioned within the interior void of the tube, a camera mast engaging the ballscrew shaft, a camera, having a wide viewing angle, mounted to the camera mast, at least one ribbon cable folded to form a helical, accordion shape and encircling the outer surface of the tube, the at least one ribbon cable having an end electrically connected to the camera, an inner tubular sleeve having a first end slidably engaging an outer surface of the second cylindrical projection of the support base so as to enclose the camera mast and the at least one ribbon cable therein, and an outer tubular sleeve having a first end and a second end, the first end slidably engaging an outer surface of the first cylindrical projection of the support base so as to enclose inner tubular sleeve therein, wherein rotation of the ballscrew shaft moves the camera mast in an upward and downward direction along a length of the ballscrew tube so as to move the camera from a hidden position within the second end of the outer tubular sleeve to a position above the outer tubular sleeve, at least one electrical cable extending from the support base between the inner tubular sleeve and outer tubular sleeve, a monitor mounting device coupled to the outer tubular sleeve, and a plurality of monitors coupled to the monitor mounting device and electrically connected to the at least one electrical cable, wherein the camera, when extended upward above the second end of the tube, is above the plurality of monitors.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a perspective view of the lower section of the retractable camera device illustrated in FIG. 1 in accordance with an embodiment;

FIG. 6 is a plan view of the top portion of the camera mast illustrated in FIG. 1 having a ribbon cable extending therethrough in accordance with an embodiment;

DETAILED DESCRIPTION

The retractable camera device is a system that may be useful, for example, during a video conference session. The retractable camera device includes a camera having a 360 degree viewing angle that may be extended when in use during the video conference or retracted when not in use. In practice, when the retractable camera device is fully extended, the camera is generally positioned at eye level with the participants of the conference so that it may clearly record them. When the retractable camera device is fully retracted, the camera itself is hidden from the sight of the participants below the top of an outer sleeve of the assembly. In this way, when retracted, the camera is removed from the line of sight of the participants so as not to distract them, and to assure the participants that they are not being recorded.

Figure 1:
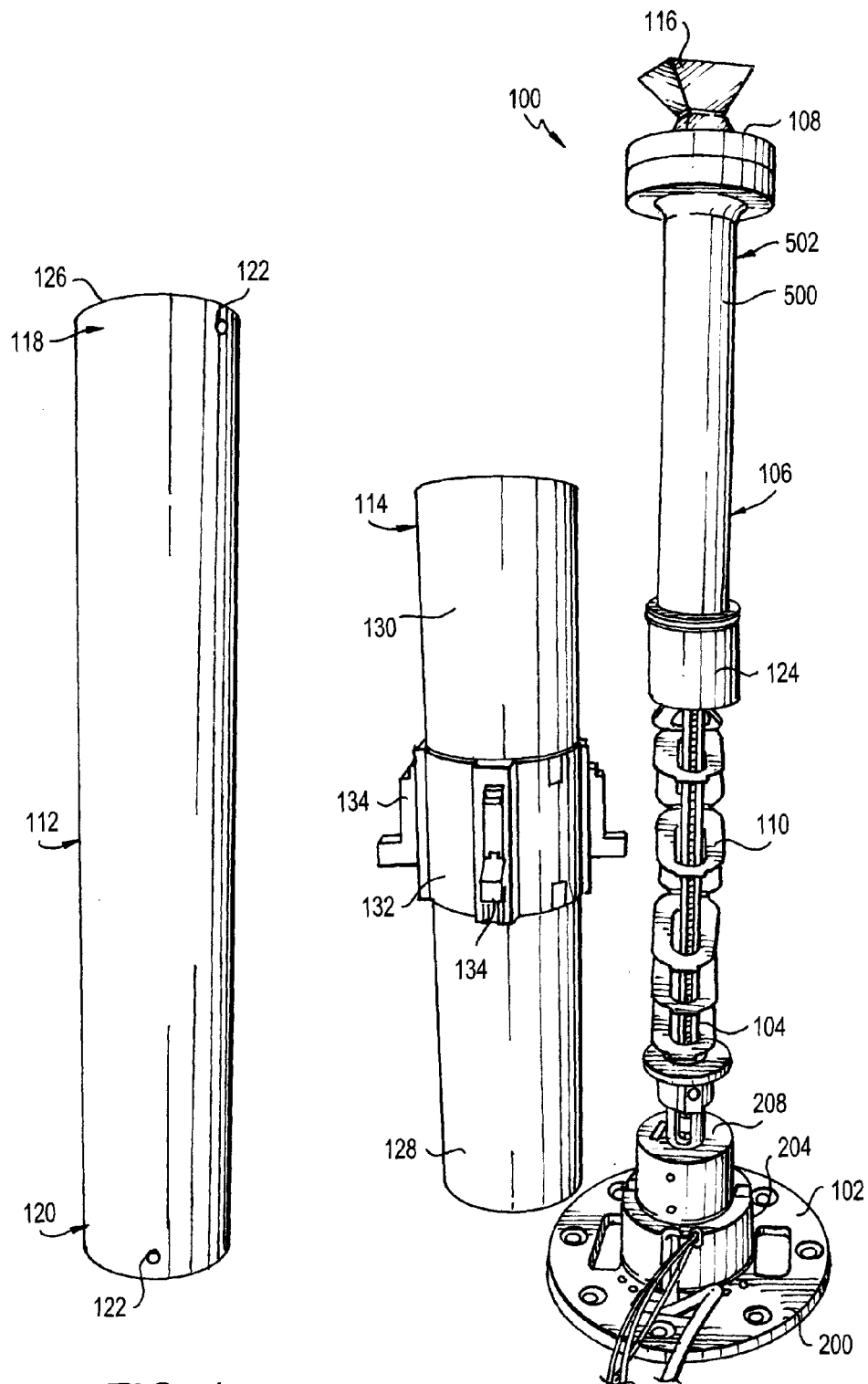
FIG. 1 is a plan view of a retractable camera device in accordance with one embodiment.

Referring to FIG. 1, the retractable camera device 100 generally comprises a support base 102, a ballscrew assembly 104, a camera mast 106, a camera 108, at least one ribbon cable 110, and an inner sleeve 112 and outer sleeve 114. The support base 102 provides the physical support for the entire assembly so that it is stable and, in one embodiment, is secured to a moveable platform. The ballscrew assembly 104 drives the camera mast 106 in an upward and downward direction along a length thereof so as to raise and lower the camera 108. At least one ribbon cable 110 electrically connects the camera 108 to at least one circuit board (discussed below) to control its operation. The inner sleeve 112 and outer sleeve 114 generally house the internal components of the retractable camera device 100 and protect such components from wear and tear during use of the device 100.

The camera 108 having the 360 degree viewing angle generally has five (5) imagers that face upward and receive images reflected off of the pentagonal mirror 116. In this way, the camera 108 may capture images coming from anywhere within a 360 degree view. The camera 108 is not limited to such an embodiment and could include any number of mirrors or imagers useful for a particular application. In some embodiments, the camera view is less than a full 360 degrees. The camera is considered a 360 degree camera if it is substantially a circular view such as 350-359 degrees. The retractable camera device is also applicable for wide view cameras, for example cameras ranging from 180 to 349 degrees such as cameras of approximately 330, 300, 270 or 180 degrees. Examples of suitable cameras 108 are disclosed in U.S. patent application Ser. No. 11/027,068, published as U.S. Patent Application Publication No. 2005/0117015, and incorporated herein by reference.

As illustrated in FIG. 2, the entire retractable camera device 100 may be supported by a support base 102. While not limited to such an embodiment, the support base 102 may be formed of a lightweight, durable metal, such as aluminum. The support base 102 is generally formed of a circular, flat substrate 200, such as a disk, having an upper surface 202. From the upper surface 202, typically in the middle of the circular substrate 200, a first, hollow cylindrical projection 204 extends. From a top surface 206 of the first cylindrical projection 204 extends a second, hollow cylindrical projection 208. A top surface 210 of the second cylindrical projection 208 may include a slot 211 for receiving the at least one ribbon cable 110 (see FIG. 4B). The diameter of the circular substrate 200 is preferably greater than the outer diameter of the first cylindrical projection 204, and the outer diameter of the first cylindrical projection 204 is greater than the outer diameter of the second cylindrical projection 208. The weight of the entire retractable camera device 100 is adequately supported by the first cylindrical projection 204 and the second cylindrical projection 208. The support base 102 may further include a third, hollow cylindrical projection 212 extending from the top surface 210 of the second cylindrical projection 208 having a diameter smaller than that of the second cylindrical projection 208.

The circular substrate 200 of the support base 102 may include a plurality of holes 214 and a plurality of slots 216 extending through the entire thickness of the substrate 200. In some embodiments, the plurality of holes 214 are used to couple the support base 102 to a movable stand platform 702 (see FIGS. 7A-B), such as with screws or bolts. In this way, the entire retractable camera assembly 100 is mobile, as the movable platform 702 may be affixed to a plurality of wheels 706. The plurality of slots 216 allow cables, such as monitor cables 218, to extend through the substrate 200. The first cylindrical projection 204 may also include channels 220 or openings 222 that allow such cables 218 to extend along the outer surface of the first cylindrical projection 204 and upwards.

The retractable camera device 100 further includes a motor 224 preferably housed within the third cylindrical projection 212 that drives the ballscrew assembly 104, as discussed below. While not limited to such an embodiment, the motor 224 is preferably an electric motor, such as a stepper motor. Alternatively, the motor 224 is housed within the first or second cylindrical projections 204, 208 as the design and arrangement of the support base 102 may be altered by one of ordinary skill in the art.

At least one circuit board 226 is housed within the support base 102. In one embodiment, two circuit boards 226 (one only shown in FIG. 2) are housed within the support base 102. A first circuit board 226 functions as an audio/video processor board, which controls function of the camera 108. As set forth herein, the at least one ribbon cable 110, which is electrically connected to the camera 108, extends through the slot 211 in the second cylindrical projection 208 and down into the interior of the support base 102 where it electrically connects to the audio/video processor board 226. A second circuit board (not shown), such as a secondary processor board, may be used to control the motor 224 or for other functions. In yet another embodiment, the first circuit board 226 functions as the audio/video processor board and also controls the motor 224 and other functions. In one embodiment, control of the audio/video processor board 226 or secondary processor board may be achieved using a remote control (not shown), as is known in the art. The remote control may communicate with the secondary processor board, for example, to activate the motor 224. These embodiments would include remote controls with an up button and a down button, with up, down and power buttons, or similar button configurations. In another embodiment, the retractable camera device 100 may be controlled by secondary electronics (not shown) that activate the motor 224 when a video conference is initiated, such as using the call state of the conference. Other automated methods of activating and deactivating the motor 224 are available.

Figures 3A, 3B:
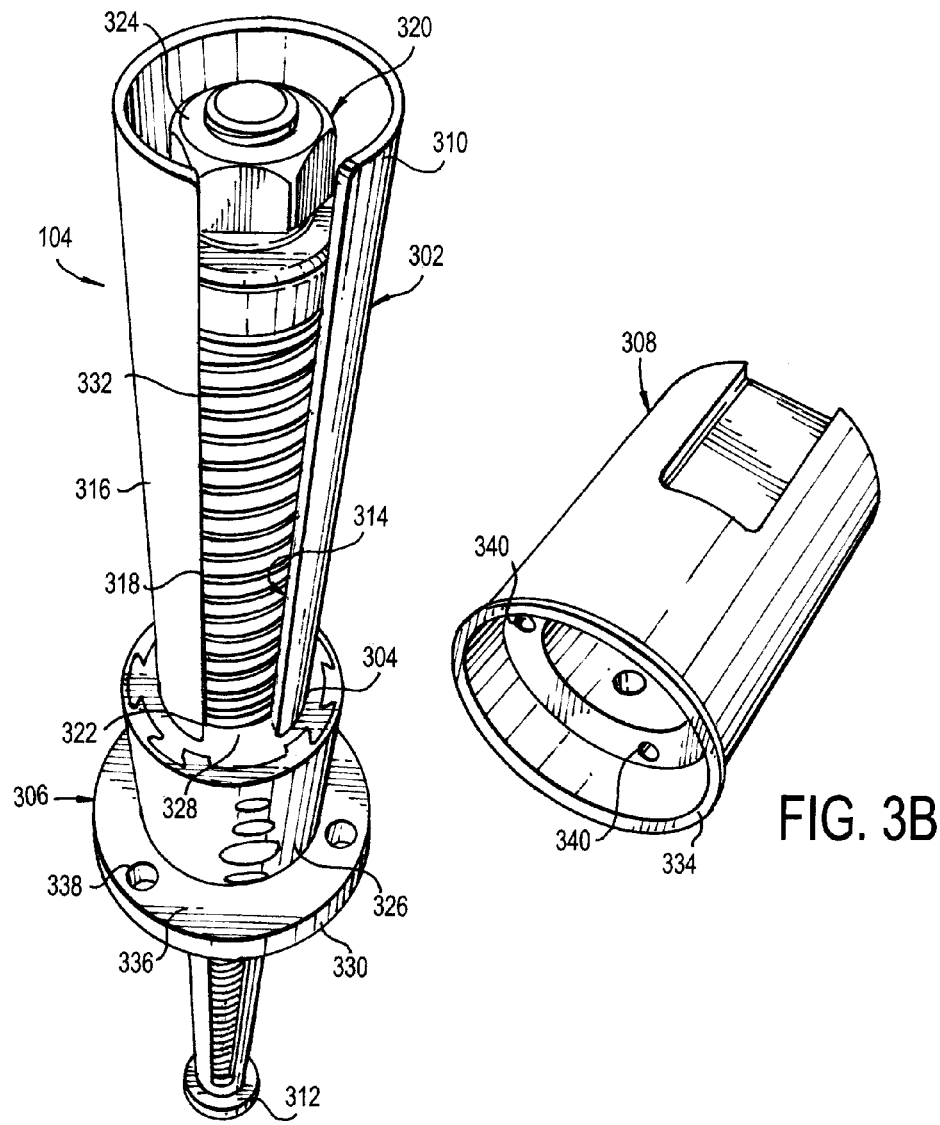
FIG. 3A is a front plan view of a ballscrew assembly in accordance with an embodiment.
FIG. 3B is a perspective view of a ball nut cover used in conjunction with the ballscrew assembly illustrated in FIG. 3A, in accordance with an embodiment.

The ballscrew assembly 104 is illustrated in FIGS. 3A-B. The ballscrew assembly 104 generally comprises a ballscrew tube 302 housing a ballscrew shaft 304, a ball nut 306, and a ball nut cover 308. The ballscrew assembly 104 is the component that is operably coupled to the camera mast 106 and which moves the camera mast 106 in an upward and downward direction along a length of the ballscrew tube 302, as set forth below.

The ballscrew tube 302 functions to house and support the ballscrew shaft 304 and protect it from the other components of the retractable camera device 100. The ballscrew tube 302 generally has two opposing ends 310, 312, an interior void 314, and an outer surface 316. While not limited to such an embodiment, the ballscrew tube 302 may have an outer diameter of about 0.5-3 inches (about 1.2-7.6 cm), preferably about 2 inches (about 5.1 cm), and a length of about 10-15 inches (about 25.4-38.1 cm), preferably about 11-12 inches (about 28 cm-30.5 cm). Further, the ballscrew tube 302 may have a lengthwise cutout 318 along at least a portion of its outer surface 316 so as to form a semi-circular cross-sectional shape. As set forth herein, the upper end 310 of the tube 302 couples to the camera mast 106 and the lower end 312 to the support base 102 for the entire retractable camera device 100. The ballscrew tube 302 may be formed of any mechanically durable material, such as metal, plastic, composite, and the like, as long as it can support the weight of the camera mast 106 and camera 108.

The ballscrew shaft 304 is housed within the interior void 314 of the ballscrew tube 302 along the length of the ballscrew tube 302. The ballscrew shaft 304 is a threaded, elongated member that rotates within the ballscrew tube 302, thereby raising and lowering the camera mast 106. The ballscrew shaft 304 generally has two opposing ends 320, 322 and, in its fully lowered state, is positioned fully inside the interior void 314 of the ballscrew tube 302 such that its opposing ends 320, 322 align with the upper end 310 and lower end 312 of the ballscrew tube 302. While not particularly limited, the ballscrew shaft 304 may have the same or a similar length as the tube 304 so as to be housed completely within the ballscrew tube 302. While the diameter of the ballscrew shaft 304 is not particularly limited, it should be smaller than the diameter of the interior void 314 of ballscrew tube 302 so that it may rotate freely within the ballscrew tube 302. The ballscrew shaft 304 may include a nut 324 having a bearing (not shown) at its upper end 320 which aligns the ballscrew shaft 304 within the ballscrew tube 302 and prevents it from tilting and/or abutting the ballscrew tube 302. The ballscrew shaft 304 may be formed of any mechanically durable material, such as metal, plastic, composite, and the like, as long as it can support the weight of the camera mast 106 and camera 108.

The ball nut 306 and ball nut cover 308 allow the camera mast 106 to be movably coupled to the ballscrew assembly 104. As illustrated in FIG. 3A, the ball nut 306 is formed of a cylindrical member 326 having a key projection 328 and a flange 330. The cylindrical member 326 is positioned around the outer surface 316 of the ballscrew tube 302. The key projection 328 is configured to fit within and engage the lengthwise cutout 318 on the ballscrew tube 302 to ensure that the ball nut 306 (and thus the camera mast 106) does not rotate as the ballscrew shaft 304 rotates. In another embodiment, however, the ball nut 306 need not include the key projection 328 and the ball nut 306 may be free to rotate. In these embodiments, the mast and the camera may be free to rotate.

The flange 330 includes internal threads (not shown) that engage the threads 332 on the ballscrew shaft 304. In this way, as the ballscrew shaft 304 rotates, the ball nut 306 is raised or lowered, depending on the direction of the rotation of the ballscrew shaft 304. The camera mast 106 is then coupled to the ball nut 306 via the ball nut cover 308. The ball nut cover 308 is positioned around the cylindrical member 326 of the ball nut 306. A lower edge 334 of the ball nut cover 308 abuts a top surface 336 of the flange 330. The flange 330 includes a plurality of holes 338 extending therethrough that align with a plurality of holes 340 on the lower edge 334 of the ball nut cover 308. In this way, the ball nut cover 308 may be coupled to the ball nut 306 via screws or bolts.

Figure 4A:
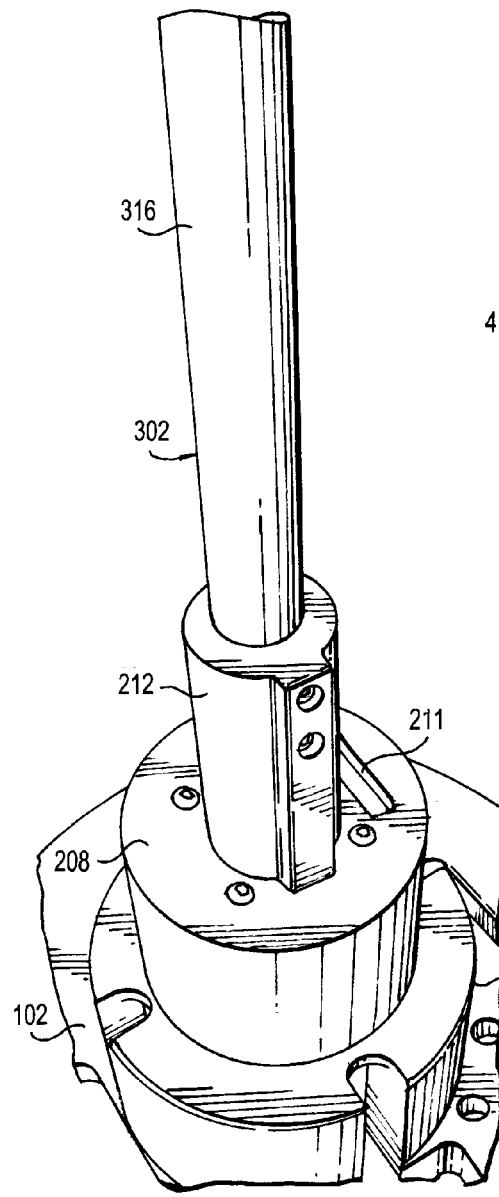
FIGS. 4A-B are back and front plan views, respectively, of the ballscrew assembly of FIG. 3A coupled to a support base in accordance with an embodiment.
Figure 4B:
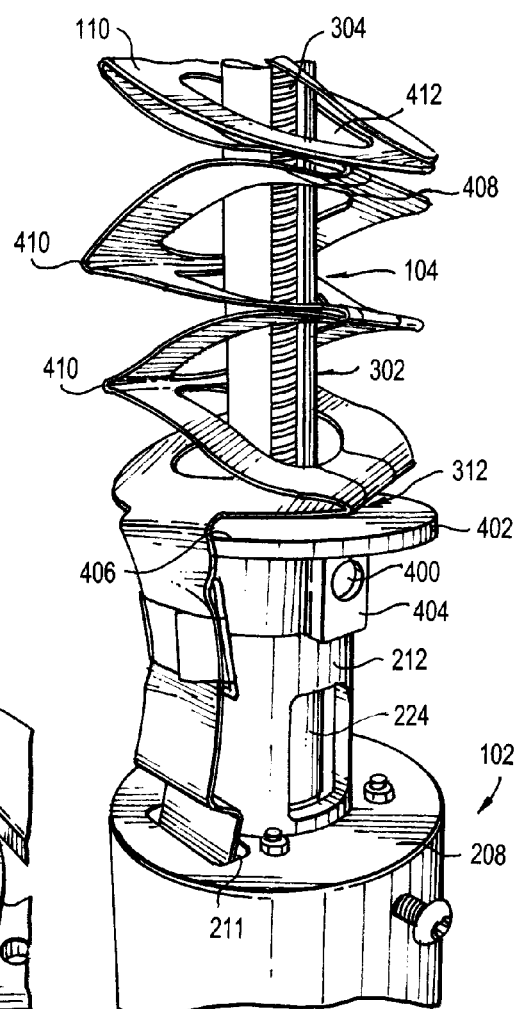

The entire ballscrew assembly 104 is coupled to the support base 102 of the retractable camera device 100, as illustrated in FIGS. 4A-B. In one embodiment, a lower end 312 of ballscrew tube 302 is coupled to the support base 102 via screws or bolts 400. The ballscrew tube 302 and ballscrew shaft 304 extend through the third cylindrical projection 212 of the support base 102. Within the third cylindrical projection 212, the ballscrew shaft 304 engages the motor 224. When the motor 224 is activated, the ballscrew shaft 304 is rotated within the ballscrew tube 302. A ballscrew attachment 402 is placed over the ballscrew tube 302 and contacts the third cylindrical projection 212 of the support base 102. The ballscrew attachment 402 provides additional support to the ballscrew tube 302 and also provides a platform on which the ribbon cable 110 can rest, as set forth below. In one embodiment, the ballscrew attachment 400 is formed of a cylindrical body 404 having a flange 406 around a top perimeter thereof. The cylindrical body 402 engages an outer surface of the third cylindrical projection 212 and attaches thereto, such as with screws or bolts. In one embodiment, the ballscrew attachment 400 may be formed as a separate component from the ballscrew tube 302. In another embodiment, the ballscrew attachment 400 may be formed integrally with the ballscrew tube 302 so that it is one, unitary piece.

The at least one ribbon cable 110 is best illustrated in FIG. 4B. In one embodiment, the ribbon cable 110 is a flat, ribbon cable folded into a helical accordion pattern that folds back on itself so as to be expanded or compressed. The ribbon cable 110 in the helical accordion pattern includes at least one first folded edge 408 and at least one second folded edge 410, such that the first folded edge 408 is positioned 180 degrees away from the second folded edge 410. This arrangement forms an accordion helix structure having a center void 412 through which the ballscrew tube 302 passes, such that the ribbon cable 110 "wraps" around the outer surface 316 of the ballscrew tube 302. In this way, as the camera mast 106 is lowered, the ribbon cable 110 may automatically or self-fold onto itself and compress, and as the camera mast 106 is raised, the ribbon cable 110 may automatic or self-unfold and expand. When in the folded position, the ribbon cable 110 rests on the ballscrew attachment 400. As set forth above, a slot 211 is provided on the second cylindrical projection 208 of the support base 102, through which the ribbon cable 110 is fed or passes. One end (not shown) of the ribbon cable 110 is then electrically connected to the audio/video processor board 226, while an opposing end is electrically connected to the camera 108 as discussed below.

Figure 5:
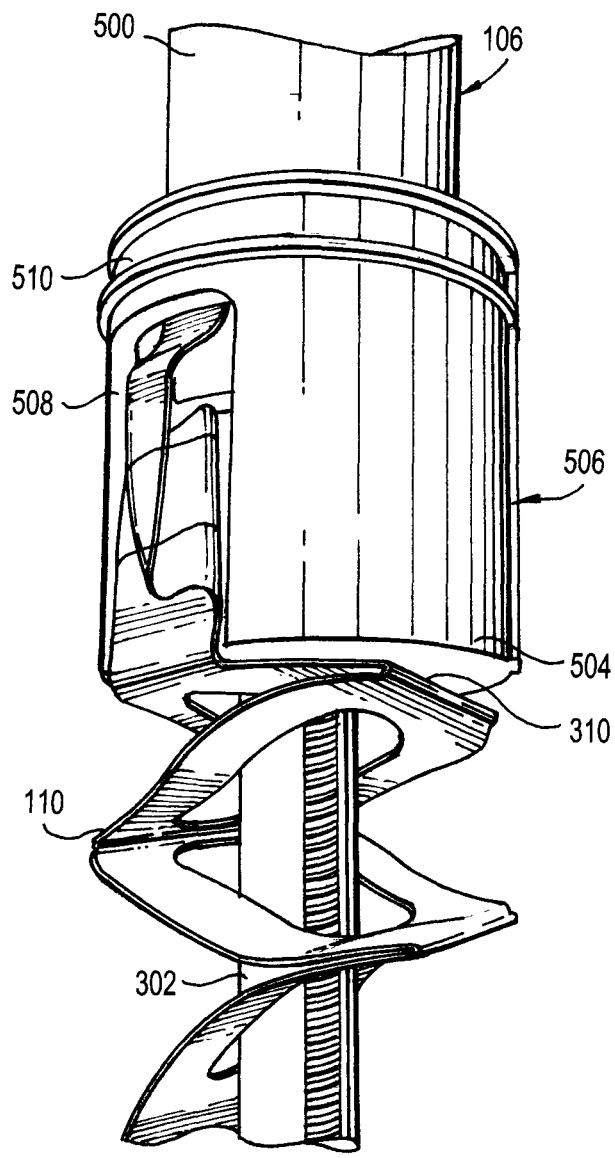
FIG. 5 is a plan view of a lower portion of a camera mast in accordance with an embodiment.

Referring to FIGS. 1 and 5, the retractable camera device 100 includes a camera mast 106 to which the camera 108 is coupled. The camera mast 106 is the component of the retractable camera device 100 that moves the camera 108 up and down into its expanded and retracted positions. The camera mast 106 is generally formed of a mast tube 500 having an upper end 502 and lower end 504 and a mast guide 506 coupled to the lower end 504 of the mast tube 500. When assembled, the mast tube 500 is slid into position over the upper end 310 of the ballscrew tube 302, such that the lower end 504 of the mast tube 500 encloses a portion of the ballscrew tube 302. The lower end 504 of the mast tube 500 is then slid into position over the ball nut cover 308 so as to enclose it. The mast guide 506 is then slid into position over the lower end 504 of the mast tube 500 and coupled thereto, such as with screws or bolts (not shown). In this way, the mast guide 506 covers the lower end 504 of the mast tube 500, which itself covers the ball nut 306 and ball nut cover 308.

The mast guide 506 functions to guide the camera mast 106 as it raises and lowers within the inner sleeve 112 (discussed below). In some embodiments, the mast guide 506 further includes at least one cutout portion 508 on a side 510 thereof to receive the at least one ribbon cable 110 such that the ribbon cable 110 may be extended up through the mast tube 500 to the camera 108.

As illustrated in FIG. 6, the camera mast 106 may further include a camera support plate 600. The camera support plate 600 functions to support the camera 108 as it is raised and lowered into its expanded and retracted positions. In one embodiment, the camera support plate 600 is formed of a circular, flat disk 602 having a flange 604 that is coupled to the upper end 502 of the mast tube 500, such as with screws, bolts, glue, or the like. The camera support plate 600 has an opening (not shown) extending through its center that engages and mates with the hollow center of the upper end 502 of the mast tube 500. The camera 108 in turn may then be coupled to the camera support plate 600. The camera 108 may be screwed, bolted, taped, or otherwise semi-permanently attached to the camera support plate 600 using any means known in the art. In this way, as the camera mast 106 is raised, the camera 108 is moved from its retracted position out of sight of the participants of the video conference to its extended position in or near the line of sight of the participants. As set forth herein, the ribbon cable 110 extends through the upper end 502 of the mast tube 500 and through the opening in the camera support plate 600 to electrically connect to the camera 108. As shown in FIG. 6, optionally, an end 606 of the ribbon cable 110 splits into two separate leads 608, 610, each of which mate with two electrical connectors (not shown) on a circuit board (not shown) that is housed within the camera 108.

Referring back to FIG. 1, the retractable camera device 100 further includes an inner sleeve 112 which encloses and protects the camera mast 106 as it moves up and down into the expanded and retracted positions. The inner sleeve 112 is a tube having an upper end 118, a bottom end 120, and an inner surface (not shown). The inner sleeve 112 slides down over the camera mast 106 and the second cylindrical projection 208 to enclose each of these components. In one embodiment, the inner diameter of the inner sleeve 112 should be slightly larger than the diameter of the second cylindrical projection 208 such that it securely fits over the second cylindrical projection 208. In one non-limiting embodiment, the inner sleeve 112 has an inner diameter of about 1-5 inches (about 2.5-12.7 cm), preferably about 3 inches (about 7.6 cm). The inner sleeve 112 may be coupled to the second cylindrical projection 208 via any means known in the art, such screws or bolts. In one embodiment, when the inner sleeve 112 is secured over the second cylindrical projection 208, it abuts the top surface 206 of the first cylindrical projection 204. The inner sleeve 112 is preferably formed of the same material as the camera mast 106. As set forth above, the mast guide 506 functions to guide the camera mast 106 within the inner sleeve 112 as the camera mast 106 is raised and lowered.

In one embodiment, the retractable camera device 100 includes at least one switch (not shown) that activates or deactivates the motor 224 when the camera mast 106 has reached its uppermost position or lowest position. Any switches known in the art may be used, such as, for example, Hall-Effect switches. In one embodiment, the inner sleeve 112 includes at least one opening 122 adjacent to its upper end 118 and its bottom end 120 to which the Hall-Effect switches mount. The mast guide 506 preferably includes at least one magnet 124 that actuates the Hall-Effect switches at either the upper end 118 or the bottom end 120 of the inner sleeve 112 to provide stopping points for the motor 224. Alternatively, a stepper motor can be configured, programmed or controlled, by a person of ordinary skill in the art, to accurately raise and lower the mast without switches. The perimeter 126 of the upper end 118 of the inner sleeve 112 may further include an inwardly-facing flange (not shown) that extends to the mast tube 500 to prevent debris from falling between the inner sleeve 112 and the mast tube 500.

In an embodiment shown, the retractable camera device 100 includes an outer sleeve 114. The outer sleeve 114 may be generally formed of three parts: a bottom tube portion 128, a top tube portion 130, and a monitor mounting device 132 positioned therebetween. The outer sleeve 114 slides over the inner sleeve 112 and over the first cylindrical projection 204 so as to enclose the entire assembly. As set forth above, the first cylindrical projection 204 includes a plurality of channels 220 through which cables 218 may extend. When the outer sleeve 114 is slid into position over the first cylindrical projection 204, the cables 218 may then extend upwards between the inner sleeve 112 and outer sleeve 114. When the outer sleeve 114 is slid onto the first cylindrical projection 204, it abuts the top surface 202 of the circular substrate 200. The inner diameter of the outer sleeve 114 is slightly larger than the diameter of the first cylindrical projection 204 such that it securely fits over the first cylindrical projection 204. In one non-limiting embodiment, the outer sleeve 114 has an inner diameter of about 1-8 inches (about 2.54-20.3 cm), preferably 4 inches (about 10.2 cm) and an outer diameter of about 2-10 inches (about 5-25.4 cm), preferably about 4.75-5 inches (about 12.1-12.7 cm). The outer sleeve 114 may be coupled to the first cylindrical projection 204 via any means known in the art, such as with screws or bolts. While the outer sleeve 114 can be made of most any material that will hold its shape, the outer sleeve 114 is preferably formed of the same material as the inner sleeve 112.

The monitor mounting device 132 includes brackets such as a plurality of L-shaped brackets 134 to which computer monitors may mount. Beneath each of the L-shaped brackets 134 is a plurality of holes 136 through which the monitor cables 218 may extend. As set forth above, the monitor cables 218 extend through the channels 220 on the first cylindrical projection 204 and upward between the inner sleeve 112 and outer sleeve 114 when both are in position. This way, the bottom tube portion 128 of the outer sleeve 114 hides the cables 218 from view.

Figure 7A:
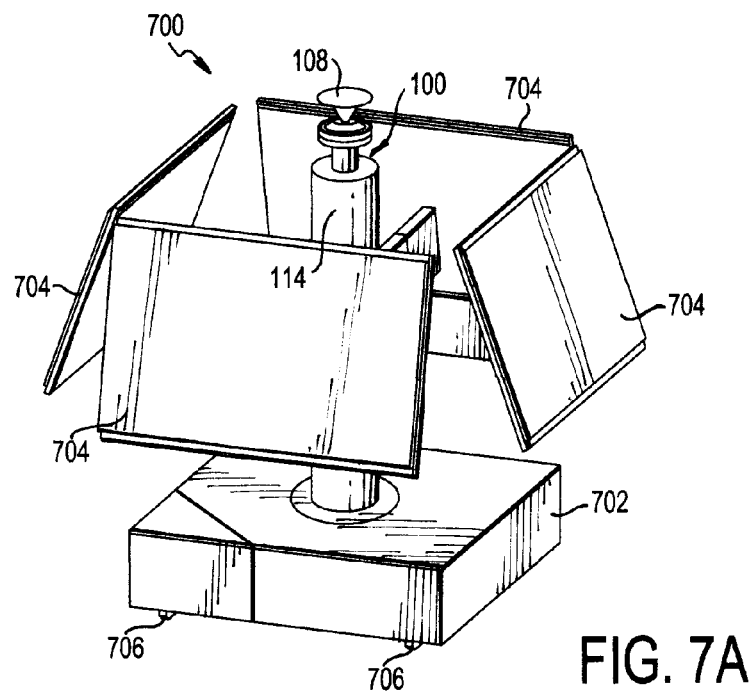
FIG. 7A is a perspective view of a videoconferencing station in accordance with an embodiment.
Figure 7B:
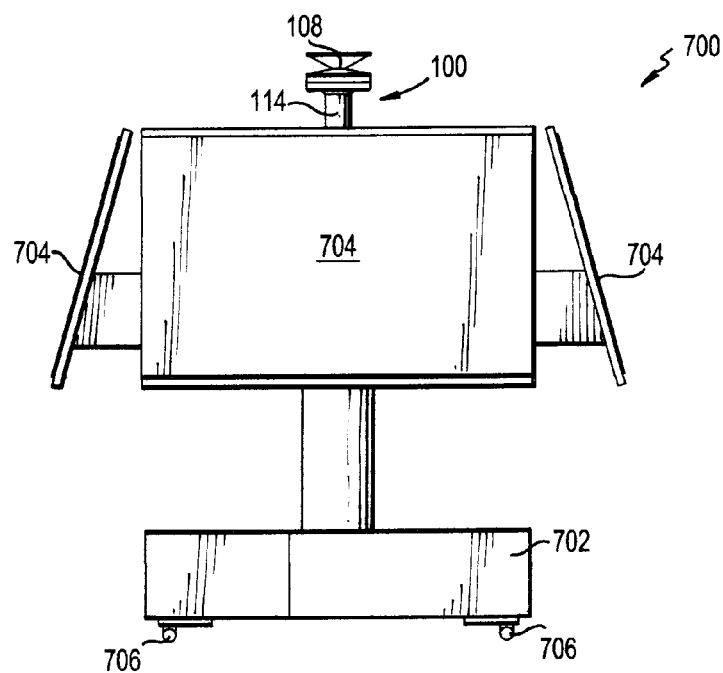
FIG. 7B is a front plan view of the videoconferencing station illustrated in FIG. 7A in accordance with an embodiment.

As shown in FIGS. 7A-B, a video conferencing station 700 generally comprises a movable platform 702, the retractable camera device 100, and a plurality of monitors 704 coupled to the monitor mounting device 132 disclosed herein. The movable platform 702 may comprise a plurality of wheels 706 affixed to a bottom surface thereof to allow the video conferencing station 700 to be mobile. In this way, video conference participants may sit around the monitors 704, which may display live feed from another location participating in the video conference. At the same time, the participants may be recorded by the camera 108, which is operated by the retractable camera device 100 as set forth herein. When in use, the camera 108 is fully extended and extends over the top of the monitors 704. When not in use, the retractable camera device 100 may be activated to lower the camera 108 to below the top of the monitors 704. Further, the camera may be lowered into the outer tubular sleeve 114. Thus, if desired, the camera 108 can be fully retracted and hidden from sight.

Although this invention has been described in connection with specific forms and embodiments thereof, it will be appreciated that various modifications other than those discussed above may be resorted to without departing from the spirit or scope. For example, equivalent elements may be substituted for those specifically shown and described, certain features may be used independently of other features, and in certain cases, particular locations of elements may be reversed or interposed, all without departing from the spirit or scope as defined in the appended Claims.

What is claimed is:

1. A retractable camera device comprising:
   a ballscrew tube having two ends, an interior void and an outer surface;
   a ballscrew shaft positioned within the interior void of the tube;
   a camera mast engaging the ballscrew shaft;
   a camera, having a 360° viewing angle, coupled to the camera mast; and
   at least one ribbon cable folded in a helical, accordion pattern and encircling the outer surface of the tube, the at least one ribbon cable having an end electrically connected to the camera,
   wherein rotation of the ballscrew shaft moves the camera mast in an upward and downward direction along a length thereof.

2. The retractable camera device of claim 1, further comprising a support base to which the ballscrew tube is operably coupled.

3. The retractable camera device of claim 2, further comprising an inner tubular sleeve which slidably engages a least a portion of the support base and which encloses the camera mast therein.

4. The retractable camera device of claim 3, further comprising an outer tubular sleeve which slidably engages at least a portion of the support base and which encloses the inner tubular sleeve therein.

5. The retractable camera device of claim 2, further comprising at least one circuit board housed within the support base and electrically connected to the at least one ribbon cable.

6. The retractable camera device of claim 2, further comprising an electric motor housed within the support base which powers movement of the camera mast.

7. The retractable camera device of claim 3, further comprising at least one switch mounted to an end of the inner tubular sleeve.

8. The retractable camera device of claim 7, wherein the at least one switch comprises two Hall-Effect switches, a first Hall-Effect switch mounted to a first end of the inner tubular sleeve and a second Hall-Effect switch mounted to a second end of the inner tubular sleeve.

9. The retractable camera device of claim 8, further comprising at least one magnet coupled to the camera mast which activates the Hall-Effect switches to control movement of the camera mast.

10. The retractable camera device of claim 1, further comprising a ball nut which is positioned around the outer surface of the ballscrew tube and which directly engages the ballscrew shaft.

11. The retractable camera device of claim 10, wherein the camera mast is operably coupled to the ball nut.

12. The retractable camera device of claim 1, further comprising a camera support plate coupled to a first end of the camera mast and supporting the camera thereon.

13. The retractable camera device of claim 3, wherein the camera mast further comprises a mast guide which aligns the camera mast as it moves upward and downward within the inner tubular sleeve.

14. A retractable camera device comprising:
    a first cylindrical projection having a slot;
    a second cylindrical projection extending from a surface of the first cylindrical projection, the second cylindrical projection having a smaller diameter than the first cylindrical projection;
    a ballscrew tube having two ends, an interior void and an outer surface;
    a ballscrew shaft positioned within the interior void of the tube;
    a ball nut positioned around the outer surface of the ballscrew tube and directly engaging the ballscrew shaft;
    a camera mast having a first end and a second end, the second end of the camera mast operably coupled to the ball nut;
    a camera support plate coupled to the first end of the camera mast;
    a camera, having a 360° viewing angle, mounted to the camera support plate;
    an inner tubular sleeve having a first end which slidably engages an outer surface of the second cylindrical projection and encloses the camera mast;
    at least one ribbon cable folded in a helical, accordion pattern, encircling the outer surface of the tube within the inner tubular sleeve and passing through the slot in the second cylindrical projection, the at least one ribbon cable having a first end electrically connected to the camera; and
    at least one circuit board, one of which is electrically connected to the second end of the at least one ribbon cable,
    wherein rotation of the ballscrew shaft moves the ball nut so as to move the camera mast in an upward and downward direction along a length of the ballscrew tube.

15. The retractable camera device of claim 14, further comprising a stepper motor which controls movement of the camera mast.

16. The retractable camera device of claim 14, further comprising at least one switch mounted to the first end of the inner tubular sleeve.

17. The retractable camera device of claim 16, wherein the at least one switch comprises least two Hall-Effect switches, a first Hall-Effect switch mounted to the first end of the inner tubular sleeve and a second Hall-Effect switch mounted to a second end of the inner tubular sleeve.

18. The retractable camera device of claim 17, further comprising at least one magnet coupled to the camera mast which activates the Hall-Effect switches to control movement of the camera mast.

19. A videoconferencing station comprising:
    a retractable camera device comprising,
    a support base;
    a first cylindrical projection extending from the support base;
    a second cylindrical projection extending from a surface of the first cylindrical projection, the second cylindrical projection having a smaller diameter than the first cylindrical projection, a ballscrew tube having two ends, an interior void, and an outer surface, a ballscrew shaft positioned within the interior void of the tube, a camera mast engaging the ballscrew shaft, a camera, having a wide viewing angle, mounted to the camera mast, at least one ribbon cable folded to form a helical, accordion shape and encircling the outer surface of the tube, the at least one ribbon cable having an end electrically connected to the camera, an inner tubular sleeve having a first end slidably engaging an outer surface of the second cylindrical projection of the support base so as to enclose the camera mast and the at least one ribbon cable therein, and an outer tubular sleeve having a first end and a second end, the first end slidably engaging an outer surface of the first cylindrical projection of the support base so as to enclose inner tubular sleeve therein, wherein rotation of the ballscrew shaft moves the camera mast in an upward and downward direction along a length of the ballscrew tube so as to move the camera from a hidden position within the second end of the outer tubular sleeve to a position above the outer tubular sleeve;

at least one electrical cable extending from the support base between the inner tubular sleeve and outer tubular sleeve;

a monitor mounting device coupled to the outer tubular sleeve; and a plurality of monitors coupled to the monitor mounting device and electrically connected to the at least one electrical cable, wherein the camera, when extended upward above the second end of the tube, is above the plurality of monitors.

20. The videoconferencing station of claim 19, wherein the second cylindrical projection includes a slot in a surface thereof through which the at least one ribbon cable passes.

21. The videoconferencing station of claim 19, wherein the monitor mounting device includes a plurality of slots through which the at least one electrical cables passes so as to electrically connect to the plurality of monitors.

* * * * *